United States Patent
Hockaday et al.

(10) Patent No.: US 9,664,116 B2
(45) Date of Patent: May 30, 2017

(54) WIRELESS POWER FOR GAS TURBINE ENGINE INSTRUMENTATION

(71) Applicant: United Technologies Corporation, Hartford, CT (US)

(72) Inventors: Bruce Hockaday, Vernon, CT (US); Thomas M. Ritter, Wethersfield, CT (US)

(73) Assignee: UNITED TECHNOLOGIES CORPORATION, Franklin, CT (US)

(*) Notice: Subject to any disclaimer, the term of this patent is extended or adjusted under 35 U.S.C. 154(b) by 295 days.

(21) Appl. No.: 14/296,851

(22) Filed: Jun. 5, 2014

(65) Prior Publication Data
US 2015/0000303 A1   Jan. 1, 2015

Related U.S. Application Data

(60) Provisional application No. 61/840,175, filed on Jun. 27, 2013.

(51) Int. Cl.

| | |
|---|---|
| F02C 7/00 | (2006.01) |
| F02C 7/32 | (2006.01) |
| F02C 3/00 | (2006.01) |
| G01K 7/02 | (2006.01) |
| F03G 7/08 | (2006.01) |
| H02K 35/02 | (2006.01) |
| G01K 13/02 | (2006.01) |
| H02N 2/18 | (2006.01) |

(52) U.S. Cl.
CPC ............... *F02C 7/32* (2013.01); *F02C 3/00* (2013.01); *F02C 7/00* (2013.01); *F03G 7/08* (2013.01); *G01K 7/02* (2013.01); *G01K 13/02* (2013.01); *H02K 35/02* (2013.01); *G01K 2013/024* (2013.01); *G01K 2215/00* (2013.01); *H02N 2/186* (2013.01)

(58) Field of Classification Search
CPC .... F02C 7/00; F02C 7/32; G02K 7/02; G01K 13/02; G01K 2215/00; H01L 23/38
See application file for complete search history.

(56) References Cited

U.S. PATENT DOCUMENTS

| | | | | |
|---|---|---|---|---|
| 5,106,203 | A  * | 4/1992 | Napoli | F01D 17/085 374/144 |
| 6,904,968 | B2 * | 6/2005 | Beitelmal | G06F 1/206 165/247 |
| 2010/0091816 | A1 * | 4/2010 | Schroll | G01K 7/04 374/165 |

(Continued)

FOREIGN PATENT DOCUMENTS

| | | |
|---|---|---|
| EP | 0296738 | 12/1988 |
| WO | 2006085869 | 8/2006 |
| WO | 2009023490 | 2/2009 |

*Primary Examiner* — Steven Sutherland
(74) *Attorney, Agent, or Firm* — Carlson, Gaskey & Olds, P.C.

(57) ABSTRACT

A gas turbine engine includes a compressor section, a combustor section and a turbine section mounted relative to an engine static structure. A module includes instrumentation that is mounted to the engine static structure. The module includes an energy harvesting power source that is configured to provide electricity to the instrumentation during engine operation and is independent of an external electrical power source.

6 Claims, 4 Drawing Sheets

(56) References Cited

U.S. PATENT DOCUMENTS

2010/0158074 A1* 6/2010 Fortier .................. G01K 1/026
374/208
2012/0324988 A1* 12/2012 Hockaday ............... G01L 15/00
73/112.01
2013/0005372 A1 1/2013 Strei et al.

* cited by examiner

WIRELESS POWER FOR GAS TURBINE ENGINE INSTRUMENTATION

CROSS-REFERENCE TO RELATED APPLICATIONS

This application claims priority to U.S. Provisional Application No. 61/840,175, which was filed on Jun. 27, 2014 and is incorporated herein by reference.

BACKGROUND

The disclosure is related to, for example, station probes employed in gas turbine engines and their power source.

Instrumentation, such as station probes, are employed in gas turbine engines to test the operation of the engine, including monitoring of the temperature and/or pressure of the working fluid (i.e., airflow) through the engine. To gather this data, station probes are positioned at various locations circumferentially and axially within the gas turbine engine.

A typical station probe consists of a tube (known as a rake portion) that extends radially into the engine with a plurality of temperature sensors (e.g., thermocouples) and inlets opened to monitor pressure located along the length of the tube. Each temperature sensor is connected by wire to a remotely located control room. Likewise, each pressure inlet is connected via pressure line (e.g., hose) to the remotely located control room. The control room includes signal conditioning circuitry for interpreting the inputs received form the temperature sensors and/or pressure inlets. Drawbacks of this architecture include long lengths of wire and/or pressure lines to connect the sensors back to the control room, which is expensive and introduces the possibility of faults along the way. Furthermore, each sensor and/or pressure inlet must be manually connected and disconnected each time the engine is moved from one test stand to another, which is a time-consuming and error-prone process.

While station probes have been made more compact, the power still has been provided from an external source that must be wired to the station probe. The wiring to the external power source has many of the same drawbacks discussed above with respect to typical instrumentation wiring.

SUMMARY

In one exemplary embodiment, a gas turbine engine includes a compressor section, a combustor section and a turbine section mounted relative to an engine static structure. A module includes instrumentation that is mounted to the engine static structure. The module includes an energy harvesting power source that is configured to provide electricity to the instrumentation during engine operation and is independent of an external electrical power source.

In a further embodiment of any of the above, the energy harvesting power source is a vibration-type energy harvesting power source.

In a further embodiment of any of the above, the energy harvesting power source includes a beam that is configured to vibrate at an engine operating frequency. Piezoelectric elements are mounted to the beam and are configured to deflect at the engine operating frequency to produce the electricity.

In a further embodiment of any of the above, the energy harvesting power source includes a beam that is configured to vibrate at an engine operating frequency. A magnet is mounted to the beam and is configured to induce the electricity in an adjacent coil at the engine operating frequency.

In a further embodiment of any of the above, the energy harvesting power source is a heat-type energy harvesting power source.

In a further embodiment of any of the above, the energy harvesting power source includes a heat source. A thermocouple is arranged adjacent to the heat source and is configured to provide the electricity in response to a heat flux from the heat source.

In a further embodiment of any of the above, the heat flux is provided by a cooling fluid within the module.

In a further embodiment of any of the above, the energy harvesting power source includes a heat source. A Peltier cell is arranged adjacent to the heat source and is configured to provide the electricity in response to a heat flux from the heat source.

In a further embodiment of any of the above, the heat flux is provided by a cooling fluid within the module.

In a further embodiment of any of the above, the energy harvesting power source is an airflow-type energy harvesting power source.

In a further embodiment of any of the above, the energy harvesting power source includes an impeller that is configured to drive a generator that provides the electricity.

In another exemplary embodiment, a station probe includes a rake portion that includes a plurality of sensors. An environmental container is attached to one end of the rake portion. The environmental container includes signal conditioning circuitry for analyzing sensor signals received from the plurality of sensors to generate measured sensor values. A communication module for communicating the measured sensor values to a control room. An energy harvesting power source is in electrical communication with at least one of the signal conditioning circuitry and the communication module.

In a further embodiment of any of the above, the environmental container includes a cooling line input for receiving a cooling fluid. A valve is connected to the cooling line input that controls a flow of cooling fluid provided via the cooling line input. A temperature sensor internal to the environmental container provides temperature feedback regarding an internal temperature of the environmental container. A controller is connected to control a position of the valve based on the monitored internal temperature of the environmental container and to regulate the flow of cooling fluid provided via the cooling line input.

In another exemplary embodiment, a station probe includes a rake portion that includes a plurality of sensors. An environmental container is attached to one end of the rake portion. The environmental container includes inputs connected to receive sensor signals from the plurality of sensors. Signal conditioning circuitry for interpreting inputs is provided by the plurality of sensors to generate measured sensor values. A cooling line input receives a cooling fluid. A valve that controls a flow of cooling fluid is provided via the cooling line input. A temperature sensor internal to the environmental container provides temperature feedback regarding an internal temperature of the environmental container. A controller is connected to control a position of the valve based on the monitored internal temperature of the environmental container and to regulate the flow of cooling fluid provided via the cooling line input. An energy harvesting power source is in electrical communication with at least one of the signal conditioning circuitry and the communication module.

BRIEF DESCRIPTION OF THE DRAWINGS

The disclosure can be further understood by reference to the following detailed description when considered in connection with the accompanying drawings wherein.

DETAILED DESCRIPTION

Figure 1:
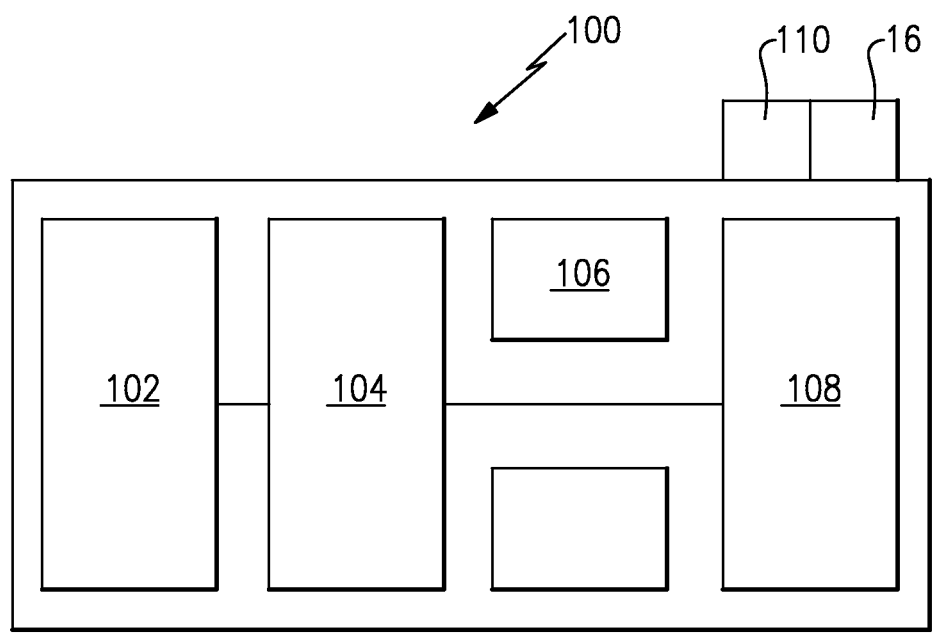
FIG. 1 is schematic of a gas turbine engine with one example engine mounted instrumentation configuration.

FIG. 1 illustrates an example gas turbine engine 100 that includes a compressor section 104, a combustor section 106 and a turbine section 108 mounted relative engine static structure, which includes a case. During operation, air is pressurized in the compressor section 104 and is mixed with fuel and burned in the combustor section 106 to generate hot combustion gases. The hot combustion gases are communicated through the turbine section 108, which extracts energy from the hot combustion gases to power the compressor section 108 and, in some applications, a fan section 102.

It should be understood that the gas turbine engine 100 may be any suitable configuration. For example, the engine 100 may include one or more spools, and the compressor and turbine sections may include one or more fixed and rotating stages within each section. In some engine applications, the fan section may be omitted, or a geared architecture may be used to rotationally drive the fan and/or compressor sections. It should also be understood that the engine 100 may be configured for commercial, military, and industrial-based applications.

In the example shown in FIG. 1, instrumentation 110 is mounted to the engine 100. A power source 116 is also mounted to the engine 100 and may be integrated with the instrumentation 110 to provide a single unit or module. The power source 16 provides independent electrical power to the instrumentation 110 using energy harvesting from vibration, heat, and/or airflow from the engine 100, such that an external power source, including power from the engine's generator, need not be used. In this manner, wiring from the instrumentation 110 to external power sources is not necessary, making installation, placement, and operation of the instrumentation 110 much more simple for gathering engine data during ground-based and/or in-flight testing and operation.

The instrumentation 110 may be placed in any suitable location in the engine 100, for example, the fan section 102, the compressor section 104, the combustor section 106, and/or the turbine section 108.

Figure 2:
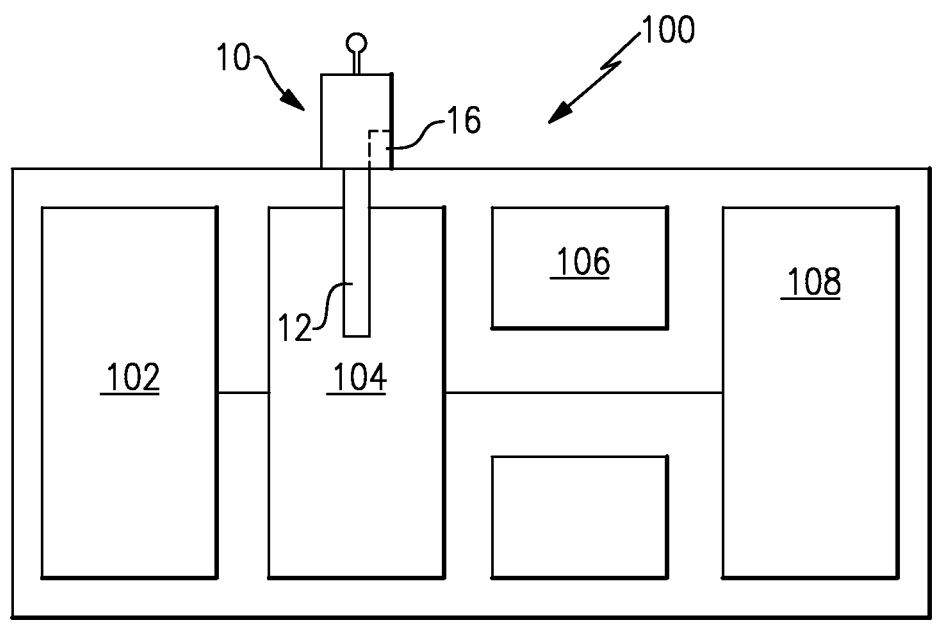
FIG. 2 is another gas turbine engine with a station probe having a rake.

In an example shown in FIG. 2, a station probe 10 having a power source 16 is mounted on the engine 100. The station probe 10 includes a rake portion 12 that extends into the engine 100, for example, into the compressor section 104. Again, the power source 16 provides independent, engine-mounted power to the instrumentation within the station probe, which avoids external wiring.

Figure 3:
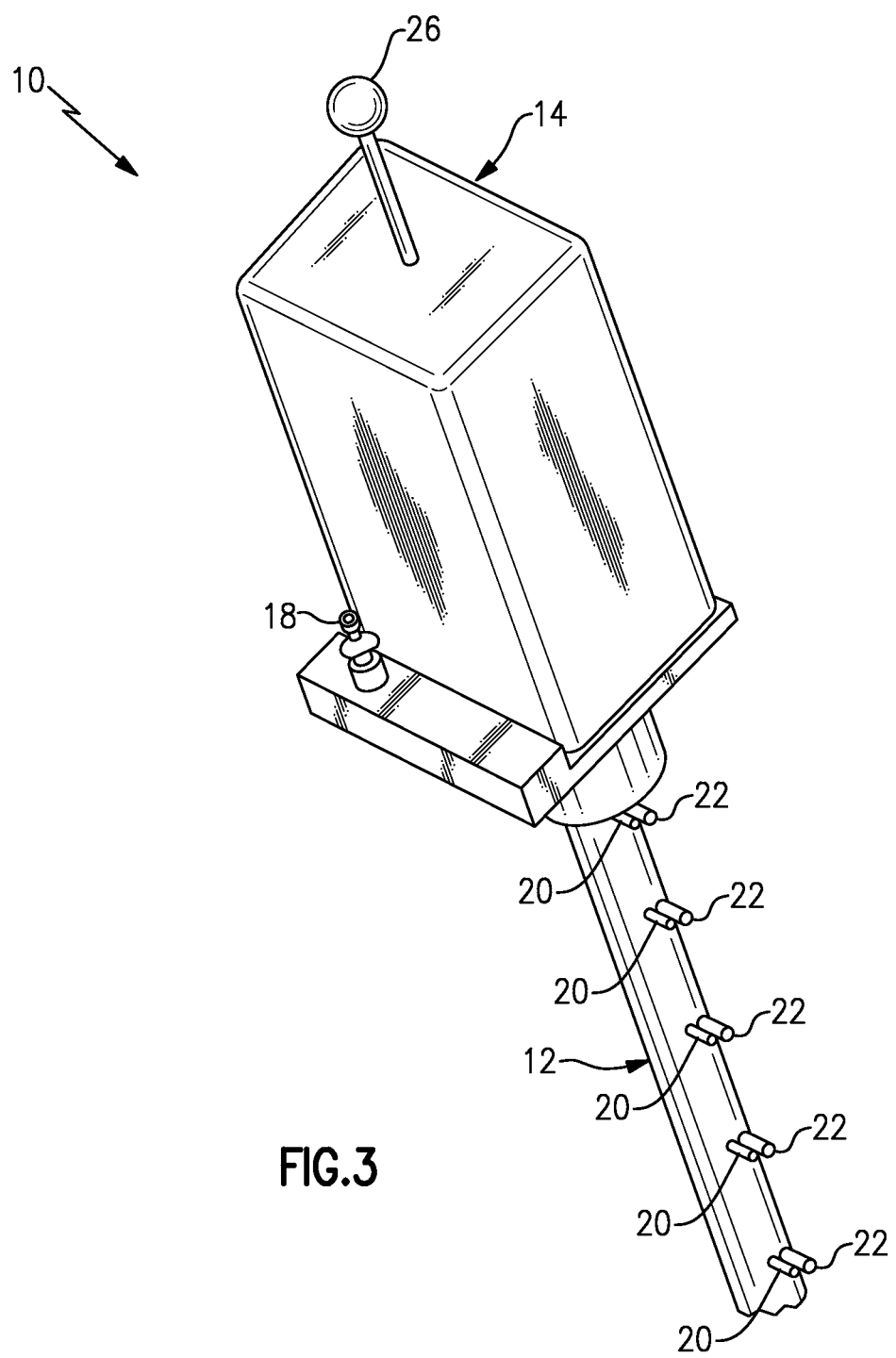
FIG. 3 is an orthogonal view of one example station probe.

FIG. 3 is an orthogonal view of station probe 10 according to an embodiment of the present invention. Station probe 10 includes rake portion 12, environmental container 14, power input 16 and cooling fluid input 18. Rake portion 12 is tubular, with a plurality of sensor locations for mounting temperature sensors 20 and pressure sensor inlets 22. Environmental container 14 houses sensor conditioning circuitry (shown in FIG. 4) for interpreting sensor signals received from temperature sensors 20 and pressure sensor inlets 22 mounted along rake portion 12. For each temperature sensor 20, a wire or pair of wires runs within the tubular portion of rake portion 12 to connect the temperature sensor to the sensor conditioning circuitry. With respect to pressure sensor inlets 22, pressure lines run within the tubular portion of rake portion 12 to connect the pressure inlets to the sensor conditioning circuitry. With respect to the pressure signal provided by the pressure lines, a pressure transducer may be employed to convert the line pressure to an analog signal for provision to the sensor conditioning circuitry.

In one embodiment, station probe 10 would be mounted on an engine casing of a gas turbine engine, with rake portion 12 extending into the path of working fluid flowing through the gas turbine engine (i.e., the gas flow). Depending on the axial location of station probe 10 along the length of the gas turbine engine, temperatures may range from moderate (e.g., room temperature) to extreme (e.g., more than six hundred degrees Fahrenheit).

To maintain accurate measurements and prevent electronic component failure (i.e., accurate interpretation of signals provided by the sensors), the temperature within environmental container 14 should remain relatively constant despite the high temperatures to which station probe 10 is exposed. For example, in one embodiment temperature sensors 20 are thermocouples, with thermocouple wires connecting each sensor 20 to signal conditioning circuitry housed in environmental container 14. The thermocouple includes a hot junction (i.e., portion of the sensor exposed along rake portion 12) and a cold junction (located within environmental container 14), wherein a voltage generated by the thermocouple is based on the temperature difference between the hot junction and the cold junction. To correctly interpret the temperature at the hot junction, the temperature at the cold junction must be tightly regulated and/or accurately measured.

To regulate temperature within environmental container 14, a cooling fluid is provided via cooling fluid input 18 to environmental container 14. A controller (shown in FIG. 4) monitors temperature within environmental container 14 and selectively controls a position of a valve (also shown in FIG. 4) to regulate the flow of the cooling fluid and therefore the temperature within environmental container 14. In this way, the temperature within environmental container 14 is controlled to a desired value, providing, for example, a stable cold junction reference for use with thermocouple sensors. In addition, environmental container 14 may include other features, such as insulation, to mitigate drastic external temperature changes. A power source 16 provides power, using energy harvesting, to circuitry included within environmental container 14, such as a controller, a valve, and sensor conditioning circuitry (shown in FIG. 4).

In the embodiment shown in FIG. 3, station probe 10 is a wireless station probe including wireless antenna 26 for transmitting sensor information from station probe 10 to a control room or data collection center. In other embodiments, a wired communication terminal is provided for communicating sensor information from station probe 10 to a control room or data collection center via a wired communication protocol.

A benefit of station probe 10 is signal conditioning circuitry is connected to various temperature sensors and/or pressure inlets only once, during assembly of station probe 10. Subsequently, station probe 10 may be installed on different engines without requiring each sensor to be individually disconnected/re-connected, only station probe 10 itself must be connected or disconnected from the engine being tested. In addition, station probe 10 does not require the presence of wires (i.e., thermocouple wires) and pressure lines extending from each sensor to a control room remotely located relative to station probe 10. Rather, the sensor signals provided by the plurality of temperature and/or pressure sensors are analyzed locally by the signal conditioning circuitry within environmental container 14 and measured temperature/pressure values are communicated wirelessly or via a single wired connection to a control room.

Figure 4:
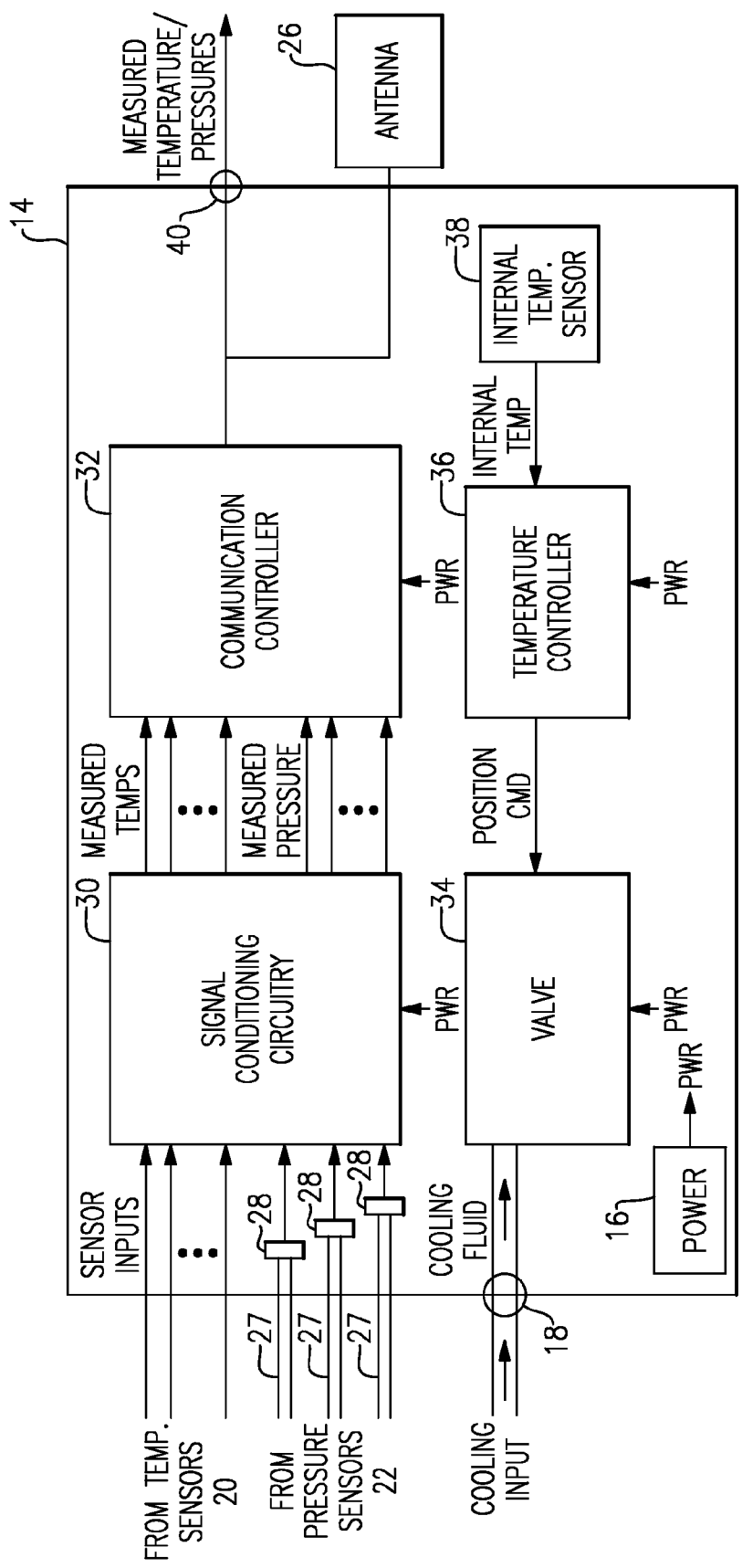
FIG. 4 is a block diagram of example components included in an environmental container portion of the station probe.

FIG. 4 is a block diagram of components included in environmental container 14 according to an embodiment of the present invention. Components include signal conditioning circuitry 30, communication controller 32, cooling fluid valve 34, temperature controller 36, and internal temperature sensor 38. Inputs provided by temperature sensors 20 and from pressure sensor inlets 22 are provided to signal conditioning circuitry 30. In response to sensor signals received from the various temperature/pressure sensors, signal conditioning circuitry 30 generates measured sensor values (i.e., converts the voltage and/or current signals provided by the sensors to values representing the measured temperature and/or pressure).

Temperature sensors 20 may be thermocouple devices that provide a current and/or voltage signal having a magnitude related to the measured temperature, resistive temperature devices (RTDs) that require signal conditioning circuitry 30 to provide a reference voltage and/or current that is modified by the RTD based on the measured temperature, or other well-known types of temperature sensor. Signal conditioning circuitry 30 monitors the voltage and/or current signals provided by temperature sensors 20 and in response generates measured temperature values for provision to communication controller 32.

Likewise, signal conditioning circuitry 30 receives pressure inputs communicated via pressure lines from pressure sensor inlets 22 via pressure lines 27 and converted to analog signal by transducers 28. In the embodiment shown in FIG. 4, a pressure transducer is employed to convert the pressure signal to an analog signal for processing by signal conditioning circuitry 30, although in other embodiments other means may be employed to convert the pressure signal to an analog or electrical signal for processing by signal conditioning circuitry 30. The measured pressure values are provided to communication controller 32, which communicates the measured temperature and/or pressure signals either via wireless antenna 26 (also shown in FIG. 3) or wired connection via wired terminal 40 to a control room and or data collection center.

The internal temperature of environmental container 14 is regulated by controller 36 to maintain a desired temperature. Temperature controller 36 receives feedback from internal temperature sensor 38 regarding the temperature inside environmental container 14. Temperature sensor 38 may be an independent temperature sensor, or may monitor voltage at a cold junction terminal associated with one or more of the thermocouple wires associated with temperature sensors 20 to measure the internal temperature of environmental container 14. In response to the monitored internal temperature, temperature controller 36 modifies a position command to cooling fluid valve 34 to increase or decrease the flow of cooling fluid, and thereby regulate the temperature within environmental container 14.

In this way, the station probe employs an environmental container to provide a stable temperature environment for housing sensor circuitry used to locally interpret temperature and/or pressure signals provided by sensors located on an attached rake portion of the station probe. This solution obviates the need for long wires and/or pressure lines to connect sensors to a remotely located control room.

Figure 5A:
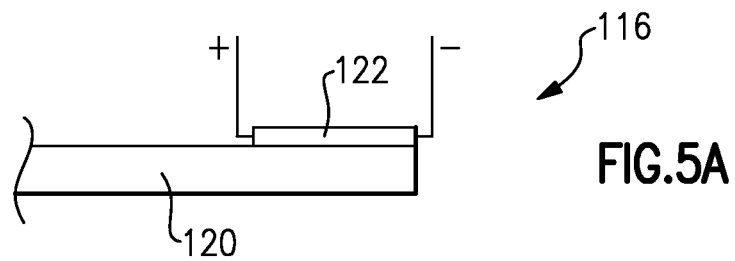
FIG. 5A is a schematic view of an example vibration energy harvesting configuration.
Figure 5B:
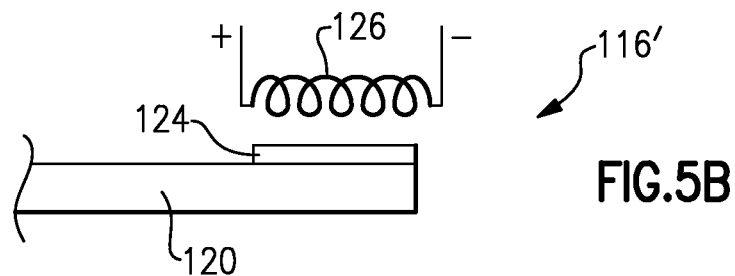
FIG. 5B is another example of a vibration energy harvesting configuration.

Example vibration-type energy harvesting power sources are shown in FIGS. 5A and 5B. Referring to FIG. 5A, a beam 120 is tuned to vibrate at an engine operating frequency. Piezoelectric elements 122 are mounted on the beam 120. The power source 116 produces electricity as the piezoelectric elements 122 deflect from vibration of the beam 120. A similar power source 116' configuration is shown in FIG. 5B. The beam 120 includes a magnet 124 that is arranged adjacent to a coil 126. As the beam 120 vibrates, the magnet induces a current within the coil 126 that provides power to the instrumentation. The location of the coil and magnet may be reversed, if desired.

Figure 6:
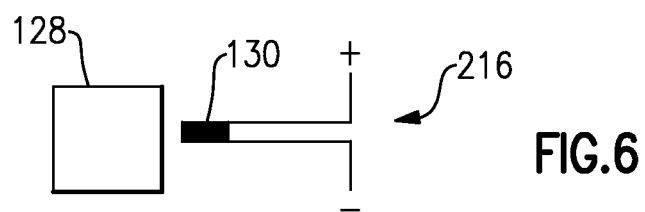
FIG. 6 is a schematic view of a heat energy harvesting configuration.

A heat-type energy harvesting configuration is shown in FIG. 6. The power source 216 is provided using a thermoelectric device 130, such as a thermocouple, thermopile, Peltier cells or other thermoelectric devices, arranged adjacent to a heat source 128. The thermoelectric device 130 produces a current in response to heat flux from the heat source 128. Signal conditioning may be used to provide a precise cold junction temperature measurement, which provide the differential temperature generating the current. The heat source 128 may be provided by the cooling fluid used to regulate the temperature of the environmental container 14. It should be understood, however, that the use of cooling fluid in the station probe 10 is optional.

Figure 7:
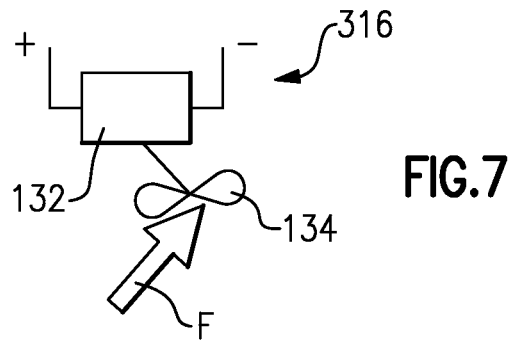
FIG. 7 is a schematic view of an airflow energy harvesting configuration.

An airflow-type energy harvesting power source 316 is shown in FIG. 7. An impeller 134 may be arranged within the working fluid path of the fan section 102, compressor section 104, and/or turbine section 108 to receive a flow F that rotationally drives the impeller 134. The impeller 134 rotationally drives a generator 132 that produces electricity to power the instrumentation.

Although example embodiments have been disclosed, a worker of ordinary skill in this art would recognize that certain modifications would come within the scope of the claims. For example, other energy harvesting configurations may be used than those described in this disclosure. For that and other reasons, the following claims should be studied to determine their true scope and content.

The invention claimed is:

1. A gas turbine engine comprising:
a compressor section, a combustor section and a turbine section mounted relative to an engine static structure;
a module including instrumentation mounted to the engine static structure, the module including an energy harvesting power source configured to provide electricity to the instrumentation during engine operation independent of an external electrical power source, wherein the energy harvesting power source includes a heat source and is configured to provide the electricity in response to a heat flux from the heat source, wherein the heat flux is provided by a cooling fluid within the module, and the module has a cooling line input for receiving the cooling fluid, a valve is connected to the cooling line input that is configured to control a flow of the cooling fluid provided via the cooling line input.

2. The gas turbine engine according to claim 1, wherein the energy harvesting power source includes a thermocouple is arranged adjacent to the heat source and configured to provide the electricity in response to the heat flux.

3. The gas turbine engine according to claim 1, wherein the energy harvesting power source includes a Peltier cell arranged adjacent to the heat source and configured to provide the electricity in response to the heat flux.

4. A station probe comprising:
a rake portion that includes a plurality of sensors;
an environmental container attached to one end of the rake portion, the environmental container including:
signal conditioning circuitry for analyzing sensor signals received from the plurality of sensors to generate measured sensor values;
a cooling line input for receiving a cooling fluid;
a valve connected to the cooling line input that controls a flow of cooling fluid provided via the cooling line input;
a temperature sensor internal to the environmental container that provides temperature feedback regarding an internal temperature of the environmental container; and
a communication module for communicating the measured sensor values to a control room; and
an energy harvesting power source in electrical communication with at least one of the signal conditioning circuitry and the communication module, wherein the energy harvesting power source includes a heat source and is configured to provide electricity in response to a heat flux from the heat source, and the heat flux is provided by the cooling fluid.

5. The station probe of claim 4, wherein the environmental container includes
a controller connected to control a position of the valve based on a monitored internal temperature of the environmental container to regulate the flow of cooling fluid provided via the cooling line input.

6. A station probe comprising:
a rake portion that includes a plurality of sensors; and
an environmental container attached to one end of the rake portion, the environmental container comprising:
inputs connected to receive sensor signals from the plurality of sensors;
signal conditioning circuitry for interpreting inputs provided by the plurality of sensors to generate measured sensor values;
a cooling line input that receives a cooling fluid;
a valve that controls a flow of cooling fluid provided via the cooling line input;
a temperature sensor internal to the environmental container that provides temperature feedback regarding an internal temperature of the environmental container;
a controller connected to control a position of the valve based on a monitored internal temperature of the environmental container to regulate the flow of cooling fluid provided via the cooling line input; and
an energy harvesting power source in electrical communication with at least one of the signal conditioning circuitry and the communication module, wherein the energy harvesting power source includes a heat source and is configured to provide electricity in response to a heat flux from the heat source, and the heat flux is provided by the cooling fluid.

* * * * *